United States Patent [19]

Jablonski et al.

[11] 4,240,941

[45] Dec. 23, 1980

[54] COATING COMPOSITIONS

[75] Inventors: Richard J. Jablonski; Denis R. Pauze, both of Scotia, N.Y.

[73] Assignee: General Electric Company, Schenectady, N.Y.

[21] Appl. No.: 923,728

[22] Filed: Jul. 11, 1978

Related U.S. Application Data

[63] Continuation of Ser. No. 538,080, Jan. 2, 1975, abandoned.

[51] Int. Cl.$^3$ .................... C08L 67/00; C08L 75/06
[52] U.S. Cl. ................... 260/29.2 TN; 260/29.2 N; 260/29.2 E; 428/458; 428/480
[58] Field of Search ............... 260/29.2 N, 29.2 NT, 260/29.2 E; 528/289, 273; 428/458, 480

[56] References Cited

U.S. PATENT DOCUMENTS

| | | | |
|---|---|---|---|
| 3,102,868 | 9/1963 | Bolton | 260/29.2 E |
| 3,412,054 | 11/1968 | Milligan et al. | 260/18 |
| 3,528,937 | 9/1970 | Reynolds et al. | 260/29.2 |
| 3,639,418 | 2/1972 | Merten | 260/309.5 |
| 3,737,478 | 6/1973 | Boldebuck | 260/29.2 N |
| 3,759,873 | 9/1973 | Hudak | 260/75 NK |
| 3,779,991 | 12/1973 | Preston | 260/32.6 SB |
| 3,856,754 | 12/1974 | Habermeier et al. | 528/289 |
| 3,897,377 | 7/1975 | Broecker et al. | 260/18 TN |
| 3,983,058 | 9/1976 | Hirooka et al. | 260/29.2 N |

OTHER PUBLICATIONS

"College Chemistry", 3rd Edition, Sisler et al., 1967, pp. 357–358, MacMillan Company, NY.

*Primary Examiner*—J. Ziegler
*Attorney, Agent, or Firm*—Morgan, Finnegan, Pine, Foley & Lee

[57] ABSTRACT

The invention relates to polymeric coating compositions which are long-lived colloidal suspensions or dispersions in water.

Polyesters, polyesterimides, polyesteramides, polyesteramideimides, polyester hydantoins and polyester urethanes are prepared. Amine material is added to the basic composition and reacted in such amounts that a colloidal dispersion is formed with water. The coating compositions are particularly useful as electric insulating coatings or wire enamels which are readily coated on a metallic or other substrate and when cured form coatings having good electrical and physical properties.

18 Claims, No Drawings

COATING COMPOSITIONS

This is a continuation of application Ser. No. 538,080, filed Jan. 2, 1975, now abandoned.

This invention relates to polymeric coating compositions. More particularly, it relates to such coating compositions which form colloids in water.

Resinous coating compositions in the form of varnishes and enamels in which for ease of application the polymer is dissolved in compatible solvents are well known. Such resinous compositions include polyesters, polyesterimides, polyesteramides, polyesteramideimides, polyesterhydantoins, and polyester urethanes, among others. Normally, the solvents used for such materials are organic and include such materials as cresols or cresylic acid, phenol, xylene, N-methylpyrrolidone, dimethylformamide, dimethyl sulfoxide, dimethylacetamide, and the like which, when driven off from the curing coating composition tend to pollute the atmosphere. Such solvents generally are also toxic, flammable, and some cause chemical burns. It would be advantageous from the point of view of complying with evermore strict pollution restrictions, as well as from the point of view of safety, to provide coating compositions of the above types which are water borne, and it is a primary object of the present invention to provide such coating materials.

Briefly, there are provided according to the present invention polyester compositions or imide, amide, hydantoin and urethane variations thereof which are water borne or form colloids in water.

The basic polyester compositions of the present invention are widely described in the literature and in patents such as U.S. Pat. Nos. 2,936,296; 3,249,578; 3,297,785; and 3,312,645, among others, the teachings of such patents being incorporated herein insofar as they are pertinent to the present teaching.

In the preparation of the present polyester compositions, dibasic, tribasic or tetrabasic or polybasic acid material and polyhydric alcohol having at least three hydroxyl groups and diol are combined in varying proportions. For example, the equivalent ratio of diol to polyhydric alcohol typically ranges from about 1 to 0.5 up to about 1 to 1.50, and preferably this ratio is 1 to 0.75. The equivalent proportion of the acid to the alcohol ranges from about 1 to 0.75 up to about 1 to 1.75, and preferably is 1 to 1.05.

In preparing the polyesterimide variation of the present invention, up to about 50 equivalent percent of the total acid constituent can be replaced by other carboxylic acid material containing imide groups such as those produced by the reaction of tricarboxylic acid material with polyamine in a 2 to 1 equivalent proportion.

Polyester hydantoin materials or polyesters containing hydantoin groups can be prepared by substituting for up to about 95 equivalent percent of the hydroxyl group containing material, hydantoin group containing material having two or more hydroxyl groups. Likewise, hydantoin group containing material having two or more acid or carboxylic groups can be substituted for up to about 95 equivalent percent of the dibasic acid material.

In preparing the polyesteramide variation of the present invention, typically up to about 50 equivalent percent of the alcohol constituent can be replaced by polyamine to form amide group containing materials. Amideimides can also be prepared with polyamine.

In preparing polyester urethanes, up to about 40 equivalent percent of the acid can be replaced by polyisocyanate.

It will be realized that the above types of polyesters can be admixed or they can be combined in various proportions as desired by utilizing the desired proportions of the various modifying group containing materials.

The dibasic acids useful in the present connection include oxalic, maleic, succinic, glutaric, adipic, pimelic, suberic, azelaic, sebacic and dodecanedioic acids as well as unsaturated materials including maleic and fumaric materials, among others. Such acids can be expressed by the formula HOOC—R'—COOH 

where R' is a divalent saturated or unsaturated aliphatic group or one containing a carbon-to-carbon double bond and having from about one to forty carbon atoms, while the anhydrides can be expressed by

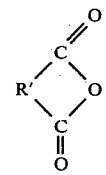

Also included are aromatic anhydrides or diacids or tetracids which are well known to those skilled in the art including, among others, isophthalic acid, terephthalic acid, mixtures thereof and their lower dialkyl esters, pyromellitic dianhydrides, benzophenonetetracarboxylic dianhydride and tetracarboxylic butane dianhydride and trimesic acid as well as heterocyclic dibasic acids such as di(2-carboxyethyl)dimethylhydantoin. The unsaturated materials are also useful for endcapping or as terminal end groups as well as in the preparation of the intermediate material. The aliphatic and aromatic polybasic acid can be used above or in admixture in the preparation of the original mix of specific acid number and then used interchangeably or together to adjust this number where indicated. Alternatively, of course, all ingredients can be added in the original mix to give a final desired acid number.

Among the polyhydric alcohols having three or more hydroxyl groups are glycerine, 1,1,1-trimethylolethane, sorbitol, mannitol, diglycerol, trimethylolpropane, pentaerythritol, tris(2-hydroxyethyl)isocyanurate, etc.

It will be realized also that in lieu of preparing the polyester variants by adding the modifying ingredients to the original reaction mixture, such variants can be prepared by first preparing the polyester itself and then introducing in well known manner imide or other desired group containing materials as is shown, for example, in the case of polyesterimides in U.S. Pat. No. 3,697,471.

Any of a number of diols can be used including ethylene glycol, neopentyl glycol, butane diol, pentane diol, and the like. Others will occur to those skilled in the art.

Among the tricarboxylic acid materials which are useful are trimellitic anhydride; 2,6,7-naphthalene tricarboxylic anhydride; 3,3',4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-terlyene tricarboxylic anhydride; 3,4-dicarboxyphenyl 3-carboxyphenyl ether anhydride; ethylene tricarboxylic anhydride; 1,2,5-naphthalene tricarboxylic anhydride; etc. The tricarboxylic acid materials can be characterized by the following formula:

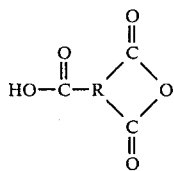

where R is a trivalent organic radical.

The polyamines useful in connection with the present invention may also be expressed by the formula

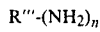

where R''' is a member selected from the class consisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms, —S—, —SO$_2$—,

and —O—, etc., and n is at least 2.

Among the specific amines useful for the present invention, either alone or in admixture, are the following:
p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$N(CH$_3$)(CH$_2$)$_3$NH$_2$
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyridine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylene diamine
polymethylene polyaniline Among the polyisocyanates useful in connection with the invention are those having two or more isocyanate groups, whether blocked or unblocked. Blocked isocyanates using as the blocking constituent phenols or alcohols, among others, can be used and in general provide a higher molecular weight final material which is advantageous in coating compositions. On the other hand, the unblocked isocyanates provide more flexible final materials. At any rate, the blocking material must be evaporated off as much as possible and there is no advantage from the purely reaction point of view to using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one mole of trimethylol propane, and three moles of phenol. In Mondur SH the isocyanate groups of mixed 2,4- and 2,6-tolylene diisocyanate are blocked by esterification with cresol. Among specific polyisocyanates which are useful alone or in admixture are the following:
tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)-benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate 3,3'-dimethoxy-4,4'-biphenylenediisocyanate
3,3'-diethoxy-4,4-biphenylenediisocyanate
1,1-bis-(4-isocyanatophenyl)-cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate The organic solvents where such are used in the present invention are well known to those skilled in the art and include N-methylpyrrolidone dimethylformamide, dimethyl sulfoxide, dimethylacetamide, and isopropanol. Where such solvents are used in conjunction with water in the present invention, they are utilized to facilitate the runnability of the final coating composition, that is, to avoid such defects in the finished coatings as blisters and streaking or alternate light and dark spots. While the above solvents can be used alone, it has been found in some cases advantageous to add up to about 10 percent by weight of other solvent such as alcohols such as butanol, ethylene glycol, propylene glycol, etc., the cellosolves or carbitols, including but not limited to butyl cellosolve, ethyl cellosolve or other ester materials such as butyl acetate, ethyl acetate, and the like.

Generally, in preparing the present materials the alcoholic ingredients and acid or substituted acidic ingredients are mixed together and heated at a temperature of about 220° C. to an acid number ranging from 0 to about 70. Where no imide groups are present, some free carboxyl groups must be present. Generally, at this point the butyl cellosolve alcohol or other similar material is added where indicated. There is then added to the solution an amine group containing material in such amount that a colloid is found upon the addition of water. Among the amine group containing materials useful in this respect are primary and secondary amines. Preferred are tertiary amines which are well known to those skilled in the art and include, among others, dimethylethanolamine, triethanolamine, phenylmethylethanolamine, butyldiethanolamine, phenyldiethanolamine, phenylethylethanolamine, methyldiethanolamine, and triethylamine. Also useful is ammonia or ammonia hydroxide. As pointed out above, final desired acid number reactant can be attained by including all of the necessary reactants in the original reactant mixture.

After the amine group containing material has been added and reacted, more water can be added to adjust the solids content of the colloidal dispersion.

The following examples illustrate the practice of the present invention, it being understood that they are not to be taken as limiting in any way. All parts unless otherwise specified are by weight.

EXAMPLE 1

A reaction vessel equipped with stirrer, condenser, Dean-Stark trap and thermometer was charged with 1420 parts trimethylol propane, 2660 parts neopentyl glycol, 1580 parts methylene dianiline, 2250 parts N-methylpyrrolidone, 3060 parts trimellitic anhydride, 3050 parts of a mixture consisting of 85 percent isophthalic acid and 15 percent terephthalic acid and 200 parts of tetraisopropyl titanate (TPT), the mixture being heated at a maximum temperature of 220° C. to an acid number of about 10.8. The contents were then cooled to about 170° C. and 1050 parts adipic acid added, the temperature being raised to and held at 220° C. until an acid number of about 37.2 was obtained. The solution was then cooled to from about 150° C. to 170° C. and 2500 parts of butanol slowly added. To the hot solution there were added 684 parts dimethylethanolamine in 700 parts of water. The contents were stirred and reacted and 18000 parts of water added to form a colloidal dispersion at 34.2 percent by weight solids. The Gardner-Holt viscosity was less than A.

A Q panel was dipped in the above dispersion, slowly removed and the coating cured for one-half hour at 100° C., for one-half hour at 150° C., and for one-half hour at 200° C. The coated panel was bent 180° with no cracking observed. The colloidal suspension was also applied to 18 AWG copper wire at 9 ft/min. to a build of 2 mils and cured at from about 200° C. to 400° C. The coating had a 2000 g. cut-through of 237° C., a flexibility at 25 percent stretch of 2X and a burn-out OFM of 5.8.

EXAMPLE 2

To a vessel equipped as in Example 1 there were added 38 parts of trimethylol propane, 71.2 parts neopentyl glycol, 81.7 parts of the isophthalic-terephthalic mixture of Example 1, 42.3 parts methylenedianiline, 81.9 parts trimellitic anhydride, 60.2 parts N-methylpyrrolidone, 5.4 parts tetraisopropyl titanate (TPT) and 25.3 parts adipic acid, the contents being reacted at a maximum of 220° C. to a carboxyl percentage of about 1.1. Then 67 parts of butanol were added. To 40 parts of the above, 17.2 parts of water were added. Then to a portion of this material, 0.05 part of dimethylethanolamine was added to accomplish 10 percent neutralization. To another sample 0.25 part of dimethylethanolamine was added to accomplish 50 percent neutralization. Both samples were then heated to 90° C. with a colloidal suspension resulting in each case, the solids content being about 40 percent by weight and the viscosity below 50 centipoises. Q panels were coated with the above materials and cured at 100° C. for one-half hour, at 150° C. for one-half hour, and 200° C. for one-half hour, the cured coatings not breaking when the panel was bent 180°.

EXAMPLE 3

Example 2 was repeated except that the reactants were reacted to an acid number of about 30. Then to a portion of this material dimethylethanolamine was added to accomplish 50 percent neutralization. A Q panel coated as in Example 2 with this new material did not crack when bent 180°.

It will be realized that in addition to their use as coating compositions, the present materials can be used in many other applications including the preparation of laminates in which they are used to impregnate the layers or laminae. They are also useful in preparing composites.

What we claim as new and desire to secure by Letters Patent of the United States is:

1. A coating composition selected from the group consisting of polyester hydantoins, polyester urethanes and mixtures thereof, said composition being reacted with a compound selected from the group consisting of an amine, ammonia and ammonium hydroxide to form a colloid in water.

2. A coating composition as in claim 1 where said compound is a tertiary amine.

3. A coating composition as in claim 2 where the tertiary amine is dimethylethanolamine.

4. A coating composition as in claim 1 where said compound is ammonia.

5. A composition as in claim 1 wherein said polyester moiety of said polyester hydantoin and said polyester urethane is the reaction product of acid material, polyhydric alcohol having at least three hydroxyl groups and diol.

6. A substrate coated with a composition comprising the composition of claim 1.

7. A laminate cohered with the composition of claim 1.

8. A composite cohered with the composition of claim 1.

9. A coating composition comprising a polyester hydantoin, said composition being reacted with a compound selected from the group consisting of an amine, ammonia and ammonium hydroxide to form a colloid in water.

10. A coating composition as in claim 9 wherein said polyester moiety is the reaction product of acid material, polyhydric alcohol having at least three hydroxyl groups and diol.

11. A coating composition as in claim 9 wherein up to about 95 equivalent percent of the hydroxyl group containing material is material having hydantoin groups with two or more hydroxyl groups.

12. A coating composition as in claim 9 wherein up to about 95 equivalent percent of the acid reactant is material having hydantoin groups with two or more carboxylic acid groups.

13. A composition as in claim 9 wherein up to about 95 equivalent percent of the acid reactant and up to about 95 equivalent percent of the hydroxyl containing material is material having hydantoin groups with at least two carboxylic acid groups and at least two hydroxyl groups.

14. A coating composition comprising a polyester urethane, said composition being reacted with a compound selected from the group consisting of an amine, ammonia and ammonium hydroxide to form a colloid in water.

15. A coating composition as in claim 14 wherein said polyester moiety is the reaction product of acid material, polyhydric alcohol having at least three hydroxyl groups and diol.

16. A coating composition as in claim 14 wherein up to 40 equivalent percent of the acid reactant is polyisocyanate.

17. The process of preparing a colloidal polyester hydantoin containing coating composition which comprises reacting polybasic acid material, polyhydric alcohol having at least three hydroxyl groups, diol and a hydantoin group containing material to form a polyester hydantoin and further reacting said polyester hydantoin with a compound selected from the group consisting of an amine, ammonia and ammonium hydroxide to form a colloid in water.

18. The process of preparing a colloidal polyester urethane containing coating composition which comprises reacting polybasic acid material, polyhydric alcohol having at least three hydroxyl groups, diol and an isocyanate group containing material to form a polyester urethane and further reacting said polyester urethane with a compound selected from the group consisting of an amine, ammonia and ammonium hydroxide to form a colloid in water.

* * * * *

UNITED STATES PATENT AND TRADEMARK OFFICE
CERTIFICATE OF CORRECTION

PATENT NO. : 4,240,941
DATED : December 23, 1980
INVENTOR(S) : Richard J. Jablonski and Denis R. Pauze It is certified that error appears in the above-identified patent and that said Letters Patent are hereby corrected as shown below:

In Column 8, line 19, Claim 16, "polysi" should read -- polyis --.

Signed and Sealed this

Twenty-eighth Day of July 1981

[SEAL]

Attest:

GERALD J. MOSSINGHOFF

Attesting Officer

Commissioner of Patents and Trademarks